E. B. FINCH.
POWER MECHANISM.
APPLICATION FILED JAN. 31, 1916.

1,315,106.

Patented Sept. 2, 1919.
3 SHEETS—SHEET 2.

Witness:
Clair J. Cote.

Inventor:
Edward B. Finch.

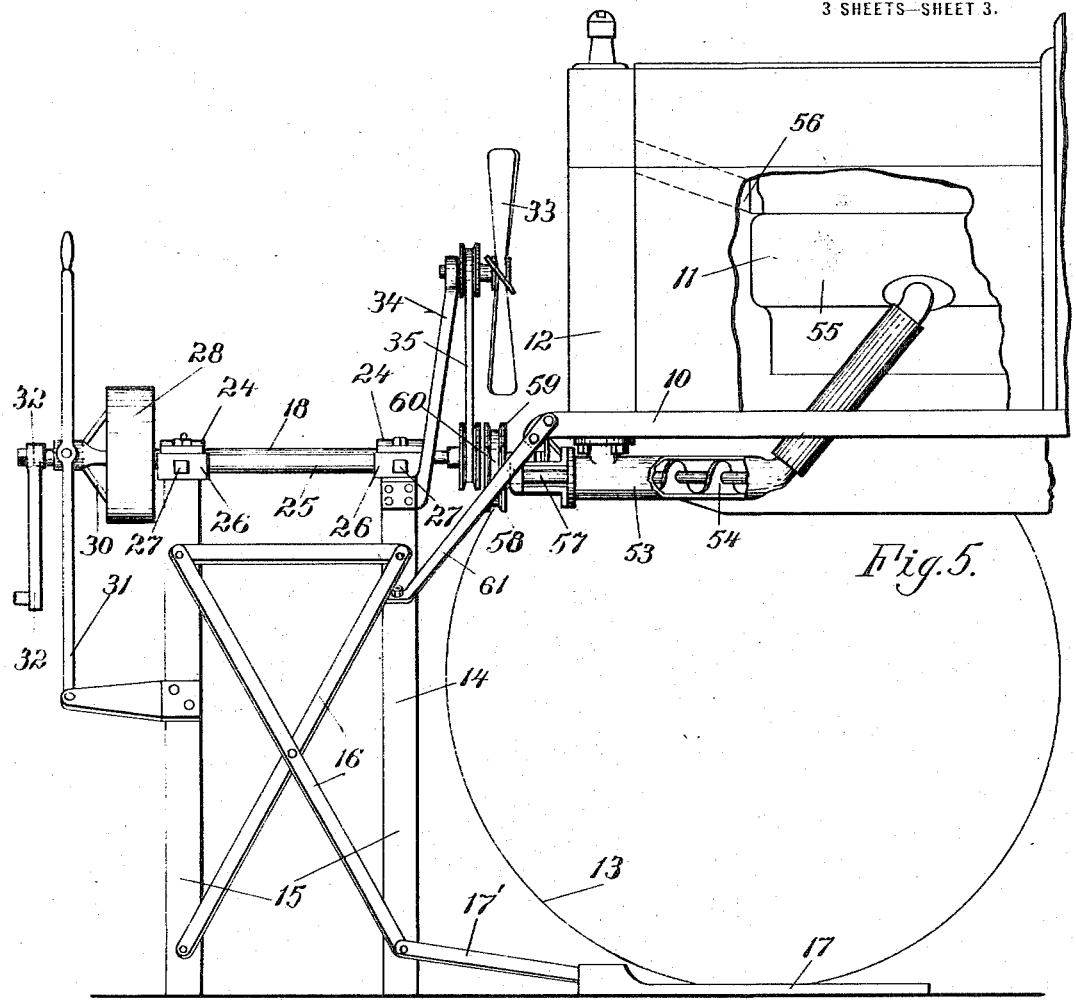
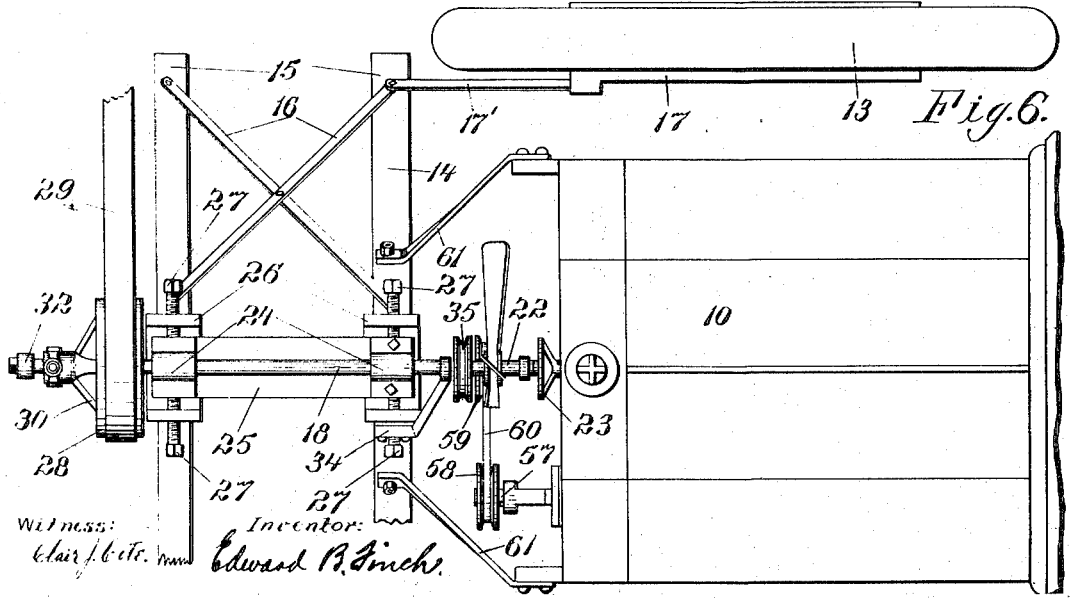

UNITED STATES PATENT OFFICE.

EDWARD B. FINCH, OF DETROIT, MICHIGAN, ASSIGNOR TO AUTOPOWER COMPANY, OF DETROIT, MICHIGAN, A CORPORATION OF MICHIGAN.

POWER MECHANISM.

1,315,106.     Specification of Letters Patent.     Patented Sept. 2, 1919.

Application filed January 31, 1916. Serial No. 75,466.

*To all whom it may concern:*

Be it known that I, EDWARD B. FINCH, a citizen of the United States, and resident of Detroit, Wayne county, State of Michigan, have invented certain new and useful Improvements in Power Mechanism, of which the following is a specification.

This invention relates to power mechanism and particularly to such mechanism having operating connections with the motor of a motor vehicle.

One of the objects of the invention is to provide a strong and simple power mechanism and connections and attachments whereby it may be driven by the motor of a motor vehicle.

Another object of the invention is to increase the cooling capacity of the radiator of a motor vehicle when unusual service is required of the motor.

Another object of the invention is to provide a power mechanism adapted to be readily connected to and disconnected from a vehicle motor whereby the mechanism may be easily carried from place to place and used as required.

Other objects of the invention will appear from the following description taken in connection with the drawings which form a part hereof, and in which.

Figure 1:
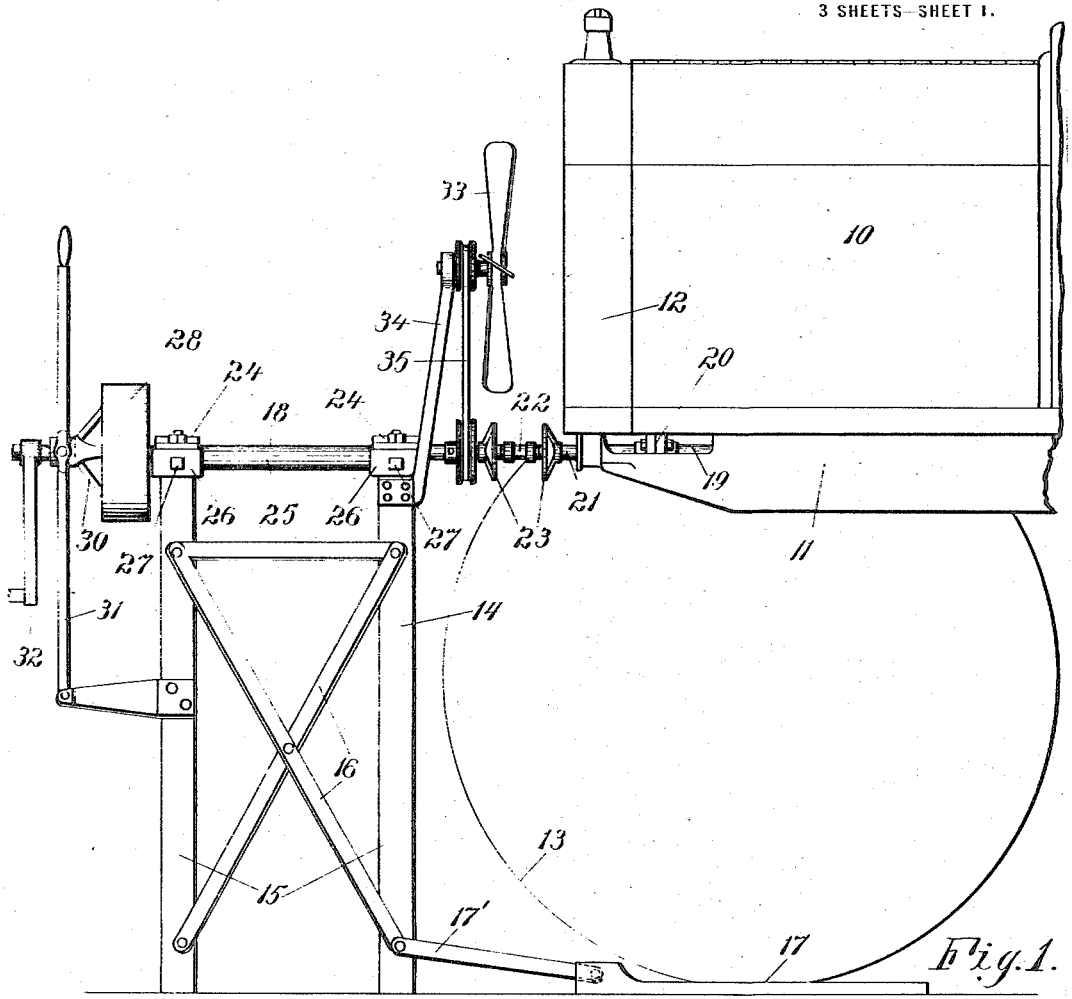
Figure 1 is a side elevation of a power mechanism and the front part of a motor vehicle, embodying the invention.
Figure 2:
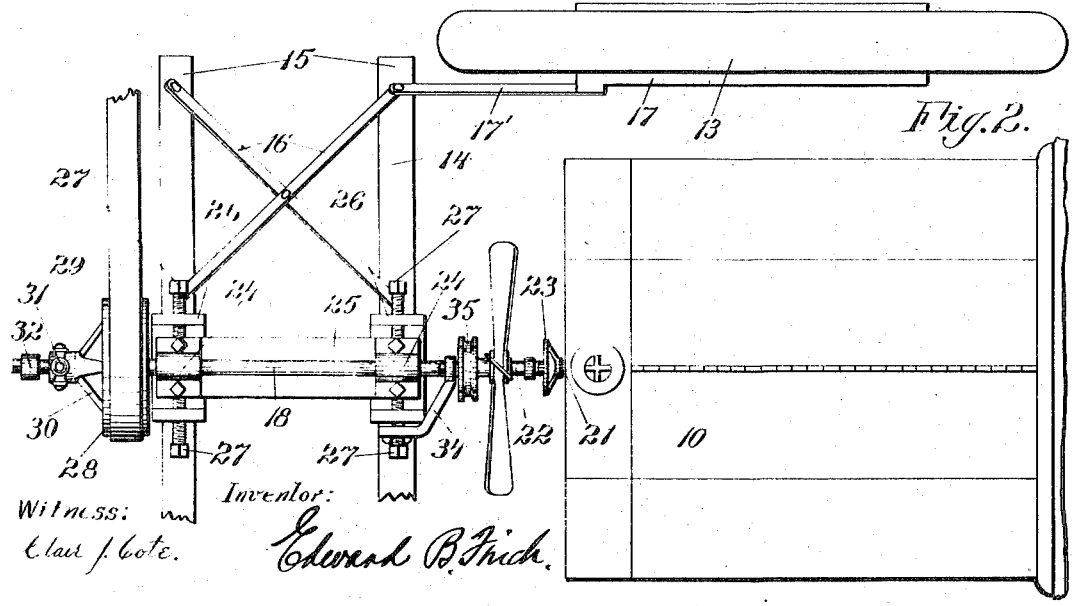
Fig. 2 is a plan view of the parts shown in Fig. 1.
Figure 3:
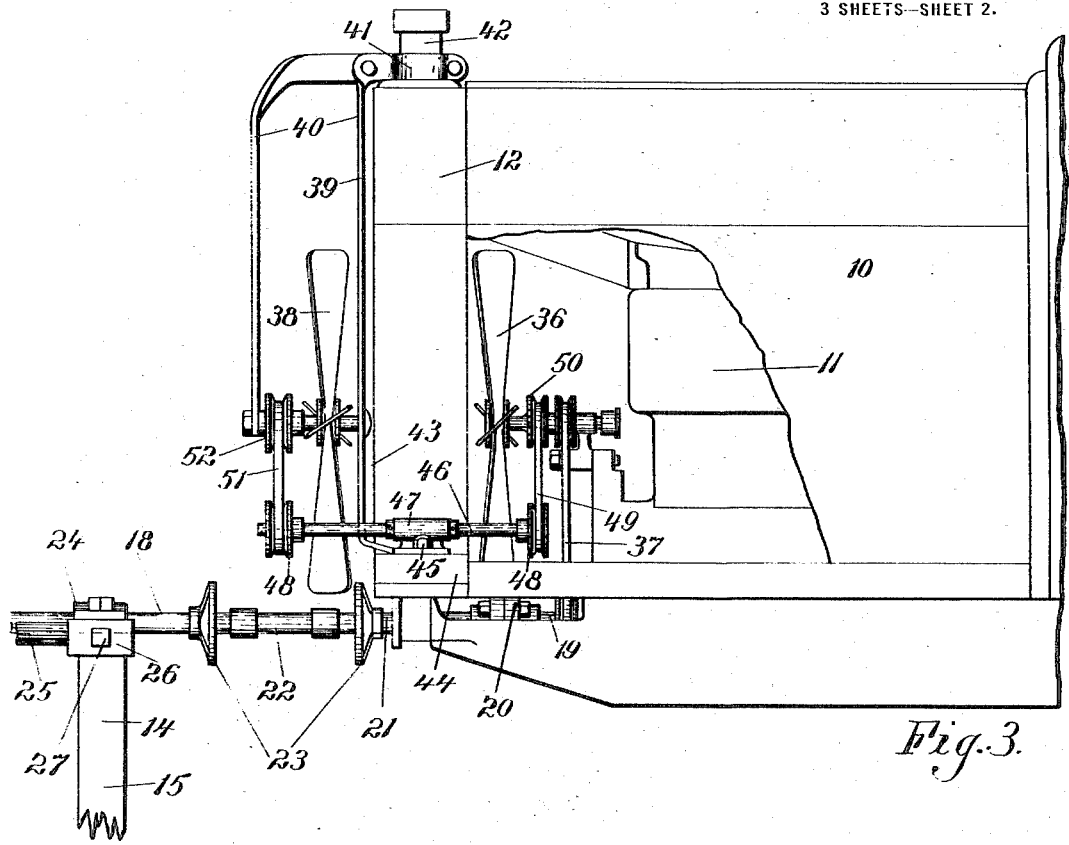
Fig. 3 is a side elevation showing another form of the invention.
Figure 4:
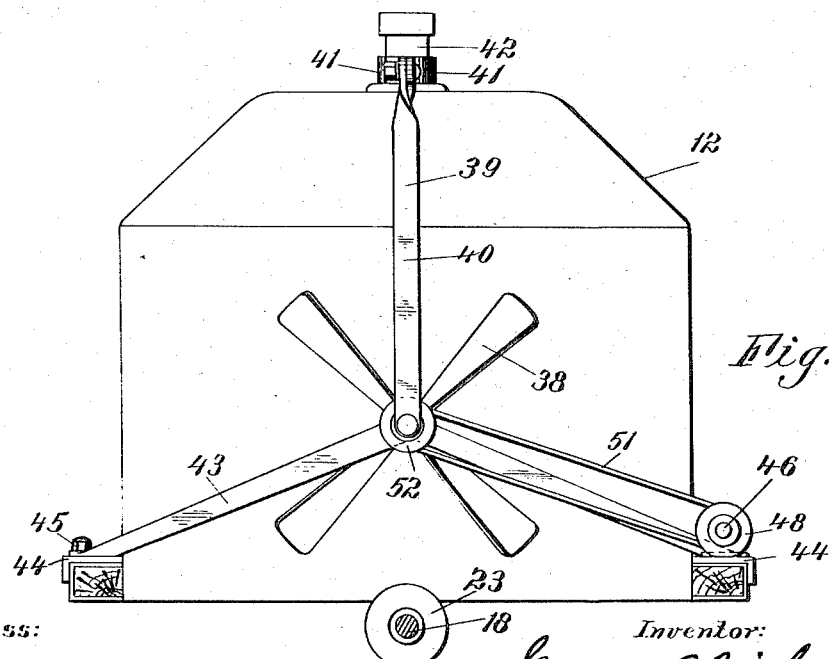

Fig. 4 is a front elevation of the vehicle shown in Fig. 3 the driving shaft being shown in section on the line 4—4 of Fig. 3; and Figs. 5 and 6 are views similar to Figs. 1 and 2, respectively, showing another form of the invention.

Referring to the drawings, 10 represents the forward part of a motor vehicle having a motor 11, the lower part only of which is shown in Fig. 1. In front of the motor is mounted a radiator 12, of usual construction, and forming part of the water circulation system which cools the motor. The forward part of the vehicle is supported upon wheels 13 with the usual axle and springs.

The power mechanism comprises a support 14 mounted in front of the vehicle motor and shown as resting on the ground. It has two pairs of legs 15, the legs of each pair being connected together at their upper ends and arranged in inverted V form and the pairs of legs being connected by straps or braces 16. Positioning tracks 17 are connected as by links 17' to the legs of one pair, these tracks being so arranged that when the wheels 13 of a vehicle are driven onto them, the front end of the vehicle will be properly positioned for forming a driving connection with the power mechanism, as shown in Figs. 1 and 2.

Upon the upper part of the support 14 is mounted a power shaft 18 which, when the vehicle is in the position shown in Figs. 1 and 2, is substantially in alinement with the crank shaft 19 extending from the front of the vehicle motor. Removably secured to the crank shaft as by a flange joint 20 is a shaft extension 21, and said extension is connected to the power shaft 18 by an intermediate shaft 22 and two universal joints 23 of any suitable construction. This universally jointed intermediate shaft permits a limited amount of misalinement of the crank shaft and power shaft without interfering with the transmission of power to the power shaft. However, for the purpose of obtaining substantial alinement of the power and crank shafts, the shaft 18 is supported in a pair of separated adjustable bearings 24. As shown these bearings are rigidly mounted on a bracket 25 which keeps them in line, and said bracket rests in U-shaped blocks or supports 26 which are mounted on the upper part of the main support 14. The bracket 25 may have either of its ends moved or adjusted laterally as by the screw bolts 27, one on either side, which bolts also lock the bracket in position in the blocks 26. This adjustment of the bearing bracket may also be used to position the shaft 18 parallel to a driven shaft with which it may be connected as by pulley 28 and belt 29. Any fast and loose pulley device may be used and as shown the pulley 28 has a clutch connection 30 with the shaft 18, the clutch being controlled by hand lever 31. At the front end of the shaft 18 is a starting crank 32 which is suitably connected with the shaft 18 for starting the motor 11.

Since the radiator of a motor vehicle is usually designed to cool the motor when the vehicle is traveling on the road, it is found to be inadequate when the motor is operated under the conditions presented by this invention, since there is then no natural circulation of air through the radiator, the vehicle being at a standstill. The fan generally employed at the rear of the radiator is seldom sufficient under these conditions. To overcome this objection the cooling capacity of the radiator is increased, in the construction shown in Figs. 1 to 4, by supplying additional air to the radiator, a fan 33 being mounted in front of the radiator 12 as a unit with the main support 14, upon a bracket 34, and driven by the shaft 18 through a belt 35.

The operation of the mechanism will be understood, it is believed, from the above description. The power mechanism mounted on the support 14 may be placed on the ground with the tracks 17 in proper position, the vehicle 10 driven up to it and onto said tracks, and the shaft 18 connected to the motor crank shaft 19 for operation by the latter. The motor may then be cranked by the starting crank 32 and the power mechanism is ready to drive any machinery to which it may be connected by the belt 29, the control being through the clutch 30. Additional circulation of air through the radiator is supplied by the fan 33.

In Figs. 3 and 4, another form of the fan unit is illustrated. A part of the motor bonnet is broken away to show the usual fan 36 mounted behind the radiator, or between the radiator and the motor, and driven from the crank shaft 19 by a belt 37. Mounted directly in front of the radiator 12 is another fan 38 supported on a bracket 39 which is detachably connected to the radiator. This bracket 39 comprises vertical separated arms 40 each of which has a part 41 which together surround and are clamped to the radiator cap 42 of the radiator. Branch arms 43 extend from one of the vertical arms to the side brackets 44 of the radiator, where they are secured by bolts 45.

The fan 38 is adapted to be driven from the fan 36 by a mechanism comprising a short shaft 46 rotatably supported in a bracket 47 which is detachably secured to the bracket 44 on the side frame of the vehicle as by the bolt 45 above referred to. The shaft has a pair of pulleys 48 one of which is connected as by a belt 49 with a pulley 50 on the shaft of the fan 36 and the other of which is connected as by a belt 51 with a pulley 52 on the shaft of the fan 38. The fan and all of its mountings and connections are readily detachable from the vehicle as will be understood.

In Figs. 5 and 6 the cooling capacity of the radiator is increased by both a fan 33 as shown in Figs. 1 and 2, and by a water circulation means 53 arranged in the piping of the water system. This means may comprise any form of pump but preferably it is such that it will not retard the flow of water through the system when it is not itself in operation. Thus the cooling system may normally operate on the thermosiphon principle with the pump 53 idle, the impeller 54 offering no appreciable resistance to the flow of water through the pump body, but when the power device is installed the pump may also be connected to be operated by the motor, and the water will be caused to flow through the system more rapidly and result in better cooling. The pump 53 of course communicates with the bottom part of the radiator 12 and its outlet end connects with the water jacket 55 of the motor. Also there is a pipe connection 56 from the upper part of the motor jacket to the upper part of the radiator, to complete the circulation system. A driving shaft 57 for the pump extends forwardly of the radiator and it is connected to be driven by the shaft 18 through pulleys 58 and 59 and a belt 60.

It will be understood that the fan and pump may both be operated with the power device or either may be used separately, depending largely upon the needs of the situation. In this latter form of the invention also the support 14 for the power shaft 18 is connected to the front part of the vehicle 10 as by the brackets 61, to better position the support and hold it in place.

Other forms of the mechanism described may be used without departing from the spirit or scope of the invention, the forms shown being illustrative only and not intended to limit the invention thereto.

Having thus described my invention, what I claim and desire to secure by Letters Patent is:—

1. The combination with a motor vehicle having a motor, of a support, a bracket mounted on said support, means for adjusting said bracket and holding it rigidly in adjusted position on said support, a shaft mounted in bearings in said bracket, and a driving connection between said shaft and the vehicle motor.

2. The combination with a motor vehicle having a motor, of a support, a bracket mounted on said support, means for adjusting said bracket bodily and angularly and holding it rigidly in adjusted position on said support, a shaft mounted in bearings in said bracket, and a driving connection between said shaft and the vehicle motor.

3. The combination with a motor vehicle having a motor and a radiator, of a support, a bracket adjustably mounted on said support, a shaft mounted in bearings in said bracket, a driving connection between said shaft and the crank shaft of the vehicle motor, a fan supported above said bracket and with its axis above the axis of the motor crank shaft, and means for driving said fan from the shaft in said bracket whereby a current of air is directed toward said radiator.

4. The combination with a motor vehicle having a motor and a radiator, of a support adapted to rest on the ground in front of the vehicle, a shaft rotatably mounted on said support and having a drive pulley, a flexible driving connection from the motor to said shaft, a bracket on said support extending upwardly from said shaft, a fan mounted in said bracket and adapted to direct a current of air toward said radiator, and means for driving said fan from said shaft.

In testimony whereof I affix my signature.

EDWARD B. FINCH.